Patented July 18, 1933

1,918,983

UNITED STATES PATENT OFFICE

ROBERT K. PRINCE, OF WESTFIELD, MASSACHUSETTS, ASSIGNOR, BY MESNE ASSIGNMENTS, TO VI-FOODS COMPANY, OF BOSTON, MASSACHUSETTS, A CORPORATION OF MASSACHUSETTS

VITAMIN CONCENTRATE AND PROCESS OF PREPARATION

No Drawing.   Application filed September 1, 1928.   Serial No. 303,613.

This invention relates to a vitamin concentrate, and more particularly one which has all the vitamins present therein in optimum ratio for making up vitamin deficiencies in human diet. Among the objects of this invention is that of producing a vitamin concentrate economically and in a form most suitable for human consumption.

Vitamin research has not yet accomplished the isolation of the vitamins, comparatively little being known even about their chemistry. During recent years, however, some light has been shed on the part that vitamins play in nutrition. For instance, it has been established that vitamins are essential to life, and that if there be a vitamin deficiency in man's diet, nutrition is disturbed and he is subject to various diseases.

There are five vitamins, namely, A, B, C, D and E, which are generally recognized at the present time. Vitamin A is associated with the growth of tissue and muscle, its presence in diet preventing an eye disease known as xerophthalmia, and playing an important part in preventing certain anemias. Vitamin B is recognized as being necessary in maintaining a normal, healthy nervous system, its absence from diet producing constipation, beriberi, and various degrees of neuritis. Vitamin C is necessary for the building of good teeth, bones, and hair, its presence in diet preventing the onset of scurvy. Vitamin D acts to prevent and also to cure rickets. Vitamin E is associated with the reproductive processes, its absence from animal diet preventing reproduction. All the vitamins are generated in the vegetable kingdom, and are transmitted to the animal when vegetable foods are assimilated by him, the vitamin content of certain animal products such as milk and cod liver oil being derived from vegetable food which the animal has assimilated.

There are many foods on the market which, owing to the processing which they have received, have been partially or completely robbed of their vitamin content. For example, the natural wheat berry has a high vitamin B content in the bran, but in the preparation of white flour the bran, along with its vitamin B content, is removed from the berry. Wheat germ has a high vitamin A content, but, inasmuch as the germ induces rancidity in the flour, the wheat germ, along with its vitamin A content, is removed. Thus, white flour made from a grain which as a whole has a relatively high vitamin content is substantially vitamin free. A large proportion of the other foods which are daily consumed are also low or entirely lacking in vitamins. For example, oleomargarine, which has replaced butter to some extent, is vitamin free. Sugar, starch, most meats, and cereals are also practically lacking in vitamins. The processing of various foods, as by cooking, canning, pasteurizing, sterilizing, ageing, etc., generally reduces the vitamin content of the foods to a considerable extent.

In order to make up vitamin deficiency, to which many diseases are attributable, various vitamin concentrates have been developed and are being marketed. Many of these concentrates are ineffective, and some while effective in some respects are ineffective in other respects, as they are usually rich in one or more vitamins and almost entirely lacking in other vitamins. Furthermore, they are generally unpalatable and expensive, familiar concentrates of this character being cod liver oil, yeast or wheat germ extracts, cod liver oil and malt emulsions, or the like.

According to this invention, a vitamin concentrate essentially free from objectionable odor and flavor is produced in the form of a powder or a tablet consisting of a substantially dehydrated blend of vegetables and containing all the vitamins in optimum ratio for making up vitamin deficiencies in human diet. Such a vitamin-rich concentrate as that made available by the present invention and containing all of the five accessory food factors is of great value, as a deficiency of any one vitamin will prevent the effective and efficient working of the other vitamins, and even a substantial increase of the other factors in which the composition is not deficient will not correct the nutritional disorders caused by the deficiency of any one factor. Owing to the finely divided condition of the vitamin-carrying materials of the concentrate of the present invention, the animal body or system is able to extract a larger proportion of the vitamin content than would ordinarily be the case if the vegetables were consumed in a raw or cooked state. Such a concentrate has proven eminently satisfactory in curing many ailments attributable to vitamin deficiency. The composition is prepared from different vegetables rich in the different vitamins. The vegetables are first dehydrated, then reduced to pulverulent condition, after which they are blended in the desired ratio and may be compressed into tablets of the desired form and size. Preferably, young vegetables are employed as a raw material, as these have a larger proportion of vitamins than full-grown vegetables.

The vegetables employed as raw materials are preferably spinach, green cabbage, white cabbage, lettuce, and carrot. All these vegetables are comparatively inexpensive and are rich in one or more of the various vitamins,—spinach being rich in vitamins A and D, green cabbage in vitamins A and D, white cabbage in vitamins B and C, lettuce in vitamin E, and carrot in vitamins A, B and C. If desired, carrot may be omitted and the proportion of spinach and white cabbage increased to furnish the desired A, B and C vitamin content. So, too, the other vegetables may be replaced by other vegetables having a correspondingly rich vitamin content, but those enumerated are preferable, owing to their economy and great stability under processing and ageing of the final product. Thus, I may use wheat germ for the purpose of A, D and E vitamins, or tomato for its C vitamin, but these raw materials possess certain disadvantages, as, for instance, the development of rancidity produced by the introduction of oil along with the wheat germ.

A specific example of procedure which may be followed in producing tablets of the desired character may be substantially as follows. The vegetables are first conditioned for dehydration. In the case of the leafy vegetables, the leaves are separated from the roots and are then preferably washed with relatively cold water to remove foreign matter. They are then sliced into strips of, say, ¼" width. The carrots are preferably washed in a washer of the foraminous drum type, a stream of relatively cold water being allowed to play on the carrots while they are being tumbled in the washer. The washed carrots are sliced into pieces of a thickness of, say, about $\frac{3}{16}$ of an inch. The vegetables thus conditioned are spread on trays, and the trays placed on racks in a dehydrating chamber, warm air at a temperature of about 90° to 110° F. being allowed to sweep the trays and then exhausted from the chamber. Dehydration under these conditions does not cause a material reduction in the vitamin content of the vegetables, nor does it induce radical enzymatic action which would tend to cause rancidity, or even disturb the cellulose structure or cause caramelization. In certain cases, it may be preferable to effect dehydration under non-oxidizing conditions, for instance with a warm, oxygen-free gas such as carbon dioxide or nitrogen rather than with air, as under such conditions the resulting product has a higher vitamin A content,—usually about 15% higher than when warm air is employed for dehydration. The dehydrating operation is continued until the vegetables have been reduced from their initial moisture content of about 90% to a residual moisture content of about 3% to 6%, this representing the minimum moisture content which may be attained under the temperature conditions given, the precise amount of residual moisture in any case depending upon the humidity of the dehydrating air employed.

The leafy dehydrated vegetables are crisp and so lend themselves to pulverization to a fine condition in any suitable type of grinding mill. For example, they may be readily reduced to about 150 to 300 mesh by passing through a coffee mill, there being little tendency for the particles to adhere to or clog the mill. The dehydrated carrot, however, is comparatively tough, owing to its binder content in the form of sugars, oil, gums, and resin. It tends to adhere to and clog grinders of the coffee grinder type, but may be readily pulverized in disintegrators of the Mead type to a particle size of about 150 to 300 mesh. The pulverized vegetables are mixed to produce a physical homogeneous blend of about the following composition:

| | Per cent |
|---|---|
| Spinach | 10 to 20 |
| Green cabbage | 5 to 15 |
| White cabbage | 25 to 40 |
| Lettuce | 3 to 7 |
| Carrot | 20 to 40 |

The pulverized blend may be used as such for introduction into foodstuffs, to enrich their vitamin content, intended for both human and animal consumption. For instance, it may be incorporated into dog biscuits or crackers, into poultry mashes, or other foods intended for animal feeding.

Preferably, about 80% to 90% of the vegetables of the blend are pulverized to about 150 to 300 mesh and about 10% to 20% of the vegetables to about 80 to 100 mesh, as such a blend when subjected to the high compressions of a tablet-forming machine yields comparatively tough, strong tablets without the use of any binding medium. The entire blend may, however, consist of vegetables pulverized to particles of about 150 to 300 mesh, if a small percentage, say, 1% to 5%, of a binder such as starch, milk sugar, East India gum, or calcium lactate is incorporated thereinto.

The blend may be compressed into tablets of the desired form and size in the usual commercial tablet machines, tablets of approximately 4-grain size being preferable, as they may be swallowed readily. Owing to the finely divided condition of the vegetables, they are readily assimilated by the system. The tablets when stored out of contact with the air and out of the sunlight show no appreciable loss in vitamin content or depreciation in other respects, even after a year.

Having thus described certain embodiments of this invention, it is evident that various changes and modifications might be made therein without departing from the spirit or scope of invention as set forth in the appended claims.

What I claim is:

1. A vitamin concentrate in tablet form, consisting of a pulverized and compressed blend of the following raw vegetables containing vitamins A, B, C, D and E in substantially the following proportions:

|  | Per cent |
|---|---|
| Spinach | 10 to 20 |
| Green cabbage | 5 to 15 |
| White cabbage | 25 to 40 |
| Lettuce | 3 to 7 |
| Carrot | 20 to 40 | and dehydrated to less than 10% of their original moisture content.

2. A process of preparing vitamin concentrate, which consists in concentrating the vitamin potency of young spinach, green cabbage, white cabbage, lettuce and carrot in crisp unwilted condition by dehydrating to less than 10% moisture content and at a temperature between 90° and 110° F., increasing the availability of the vitamin present by pulverizing the dehydrated vegetables to form a fine dry powder of vegetable fibre, and blending the powder in substantially the following proportions:

|  | Per cent |
|---|---|
| Spinach | 10 to 20 |
| Green cabbage | 5 to 15 |
| White cabbage | 25 to 40 |
| Lettuce | 3 to 7 |
| Carrot | 20 to 40 |

3. A process of preparing vitamin concentrate, which consists in independently dehydrating different raw vegetable materials containing respectively vitamins A, B, C, D, and E, from an unwilted condition to a condition in which their moisture content is reduced to less than 10% by weight, and thereby concentrating the vitamin potency of the resulting material, pulverizing the dehydrated material of each vegetable to form a dry powder of vegetable tissue, thereby greatly increasing the availability of the vitamin and blending the powder in substantially the following proportions:

Vitamin A—containing vegetable material—10% to 20%

Vitamin B—containing vegetable material—5% to 15%

Vitamin C—containing vegetable material—25% to 40%

Vitamin D—containing vegetable material—3% to 7%

Vitamin E—containing vegetable material—20% to 40%

4. A vitamin concentrate in tablet form consisting of a pulverized and compressed blend of vegetable tissue of raw vegetables containing respectively vitamins A, B, C, D, and E in substantially the following proportions:

Vitamin A—containing vegetable material—10% to 20%

Vitamin B—containing vegetable material—5% to 15%

Vitamin C—containing vegetable material—25% to 40%

Vitamin D—containing vegetable material—3% to 7%

Vitamin E—containing vegetable material—20% to 40% and dehydrated to less than 10% of the original moisture content.

ROBERT K. PRINCE.